May 29, 1928.　　　　　　　　　　1,671,444
A. E. NORRIS
GRAB
Filed Sept. 14, 1926　　　6 Sheets-Sheet 4
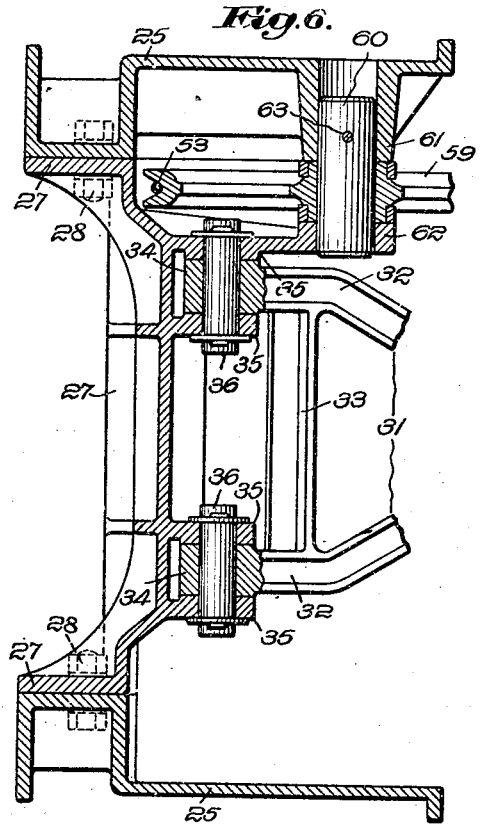
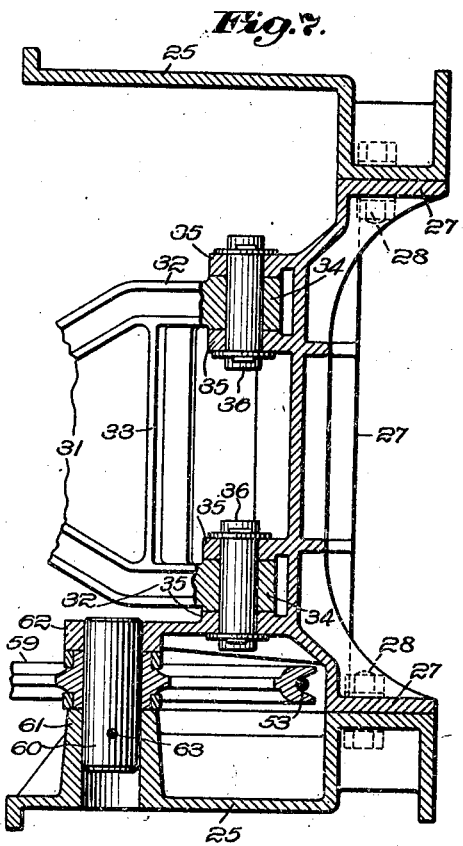
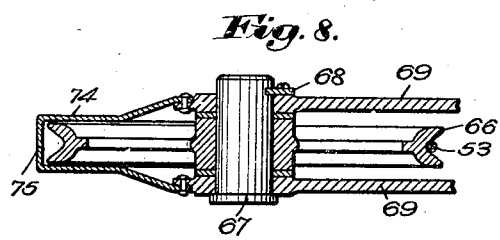
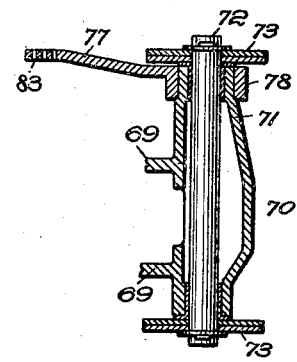
Inventor:
Almon E. Norris,
by Emery, Booth, Janney & Varney,
Attys.

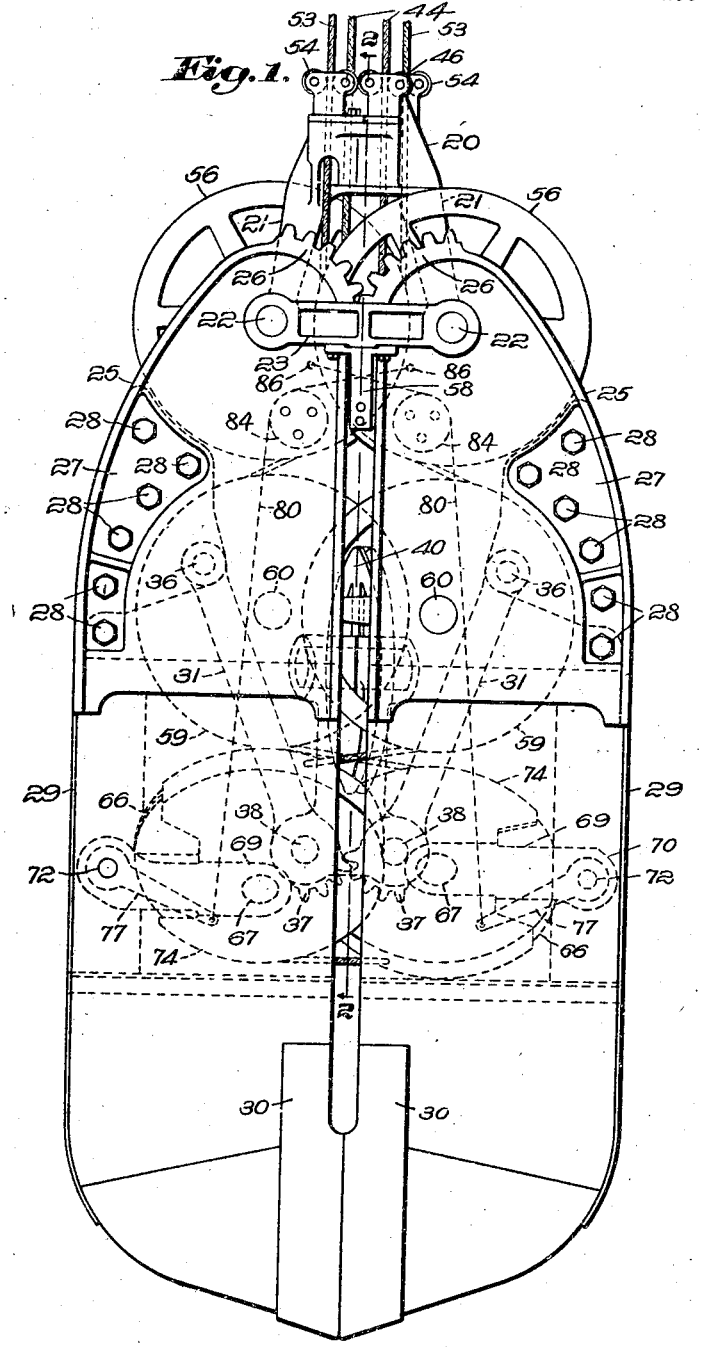

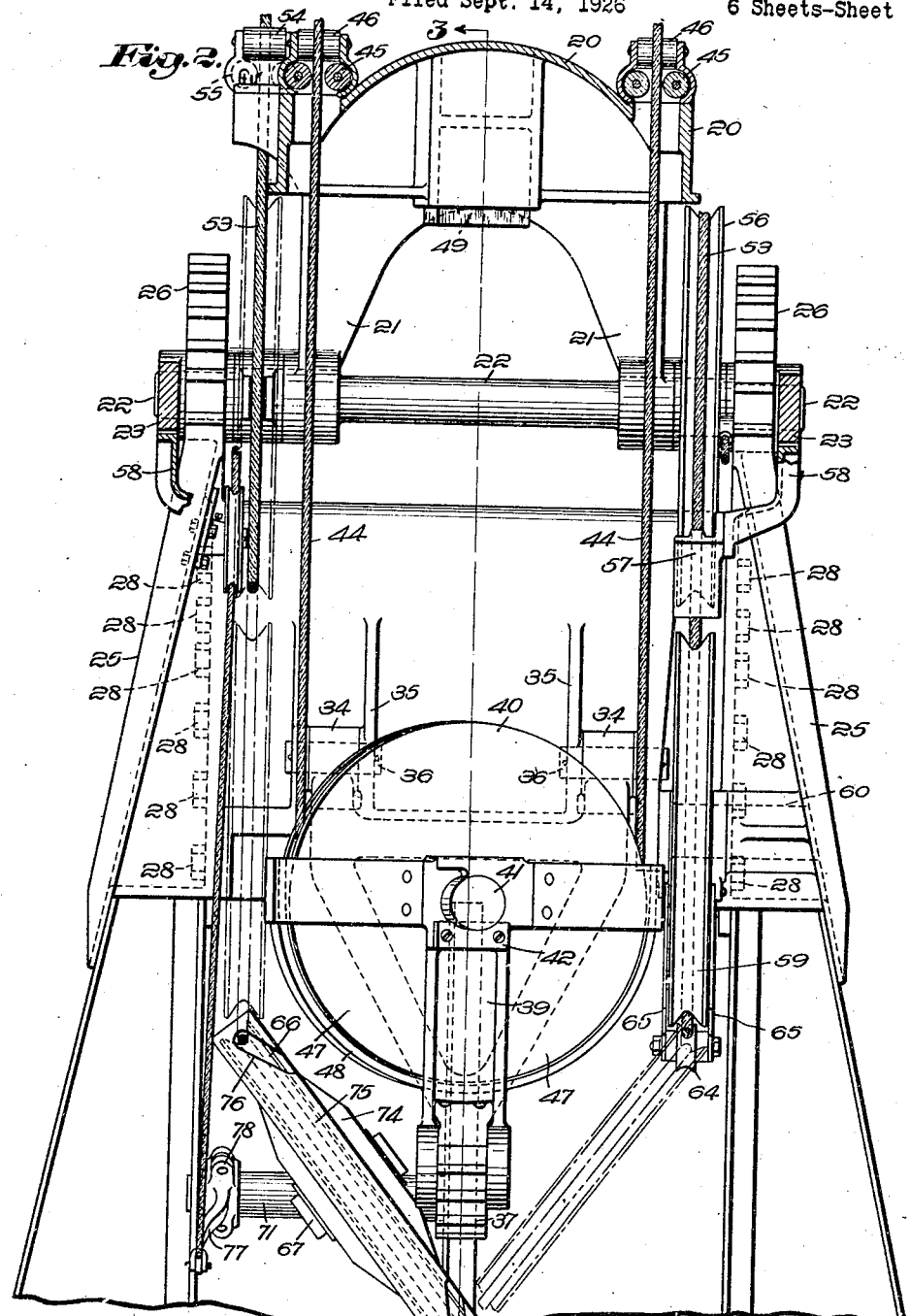

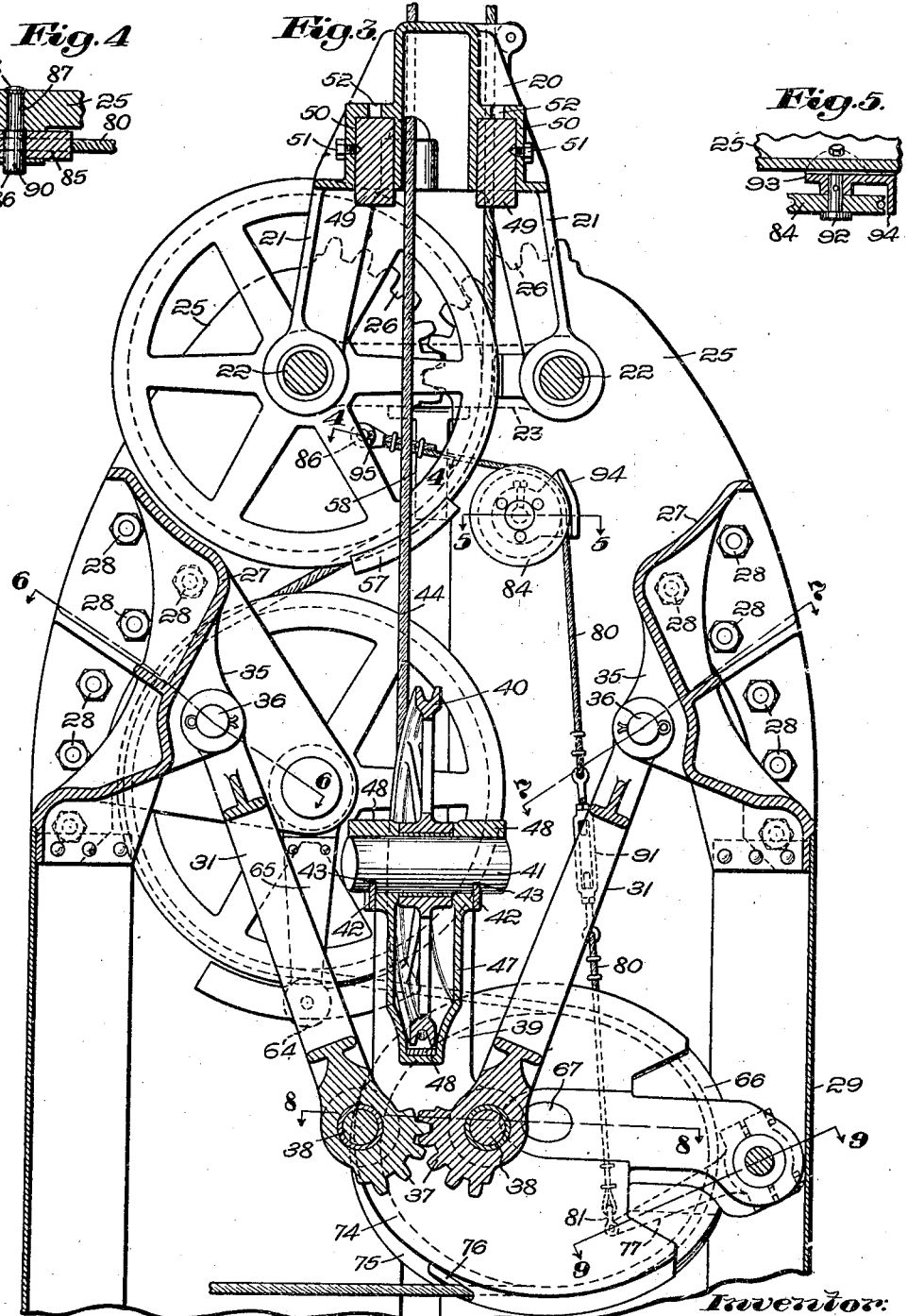

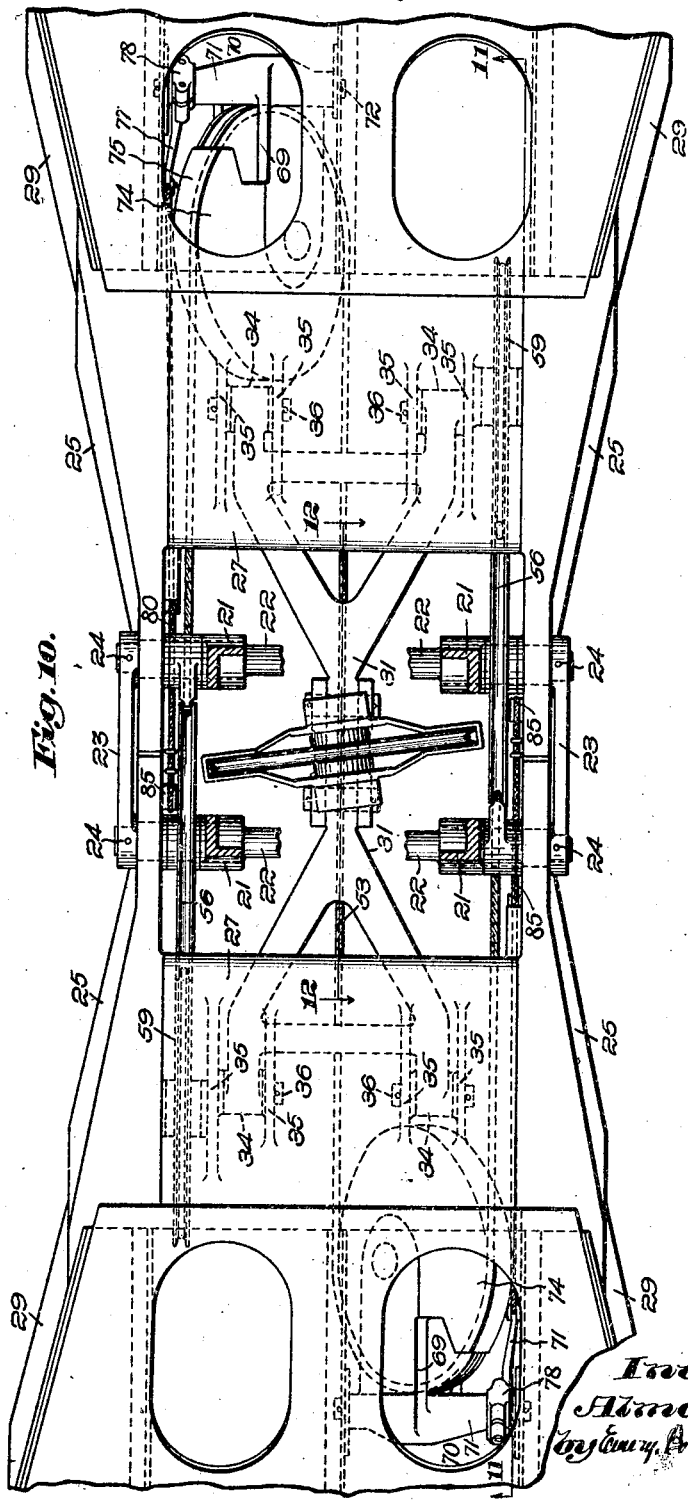

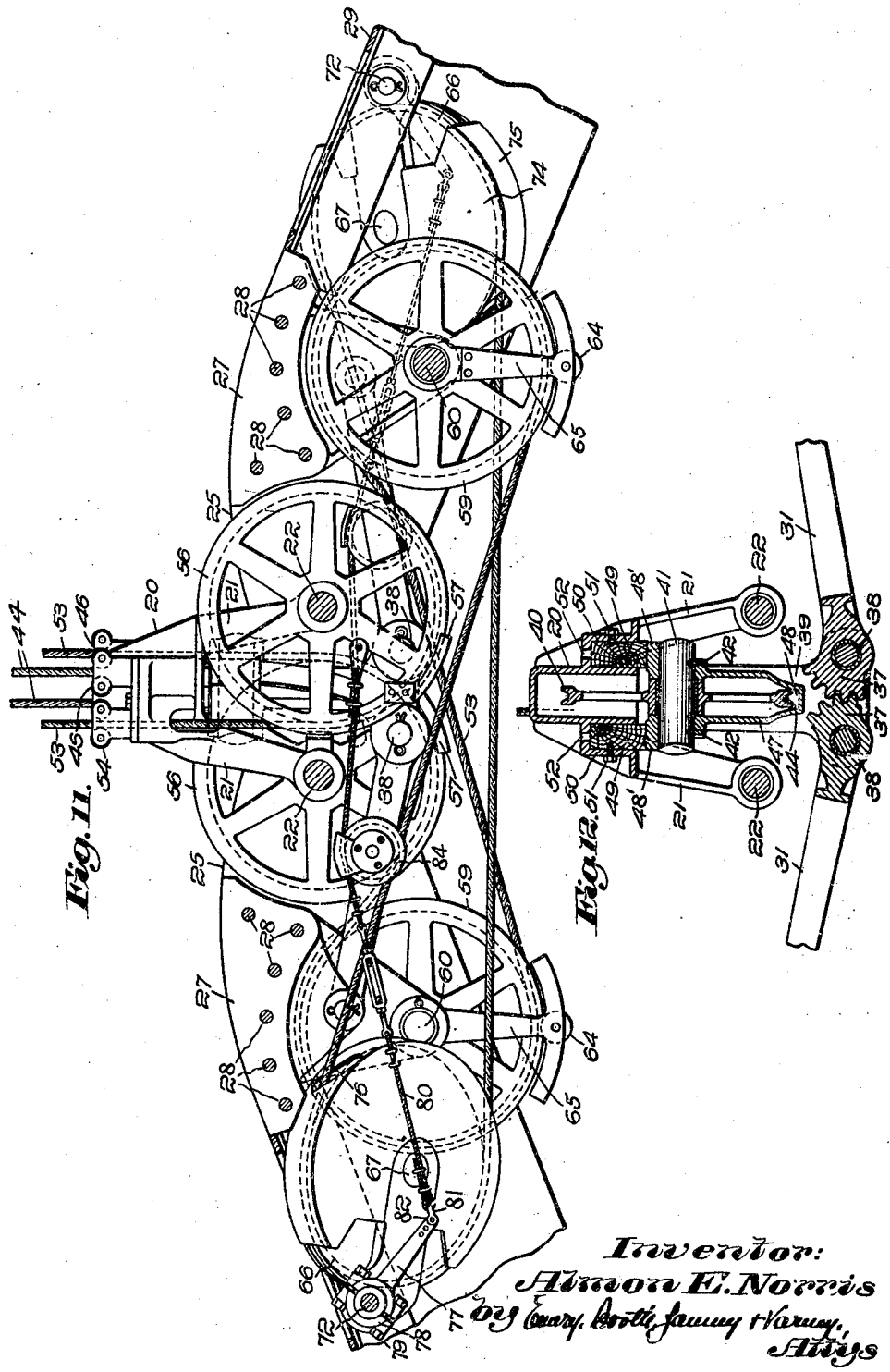

Patented May 29, 1928.

1,671,444

UNITED STATES PATENT OFFICE.

ALMON E. NORRIS, OF BROOKLINE, MASSACHUSETTS.

GRAB.

Application filed September 14, 1926. Serial No. 135,329.

This invention relates to a grab and is more especially concerned with a grab of the "clean-up" type having a wide spread to enable it to cover a large area. The invention will be best understood by reference to the following description when taken in connection with the accompanying drawings of one specific embodiment thereof, while its scope will be more particularly pointed out in the appended claims.

In the drawings:

Figure 1 is an elevation of a grab embodying the invention, showing the same as it appears when closed;

Figure 2 is a sectional view on an enlarged scale on line 2—2 of Figure 1;

Figure 3 is a sectional view on line 3—3 of Figure 2;

Figure 4 is a sectional view on line 4—4 of Figure 3;

Figure 5 is a sectional view on line 5—5 of Figure 3;

Figure 6 is a sectional view on line 6—6 of Figure 3;

Figure 7 is a sectional view on line 7—7 of Figure 3;

Figure 8 is a sectional view on line 8—8 of Figure 3;

Figure 9 is a sectional view on line 9—9 of Figure 3;

Figure 10 is a plan partly in horizontal section of the grab as it appears when open, the shells being partly broken away to save space;

Figure 11 is a sectional view on a reduced scale on line 11—11 of Figure 10; and Figure 12 is a sectional view on a reduced scale on line 12—12 of Figure 10.

Referring to the drawings and to the embodiment of the invention which is selected for exemplification, and having reference at first to Figure 3, the grab comprises an upper or top head 20, presenting depending arms 2, herein four in number (see Figure 10), arranged in pairs and receiving two hinge pins 22. For the sake of light weight and convenience of manufacture, while giving the structure the requisite degree of strength, the hinge pins are connected to each other by yokes 23 (see Fig. 10) which are suitably secured to the terminal portions of the hinge pins as by pins 24.

The hinge pins afford pivots for hinge pieces 25, herein four in number, arranged in pairs, the hinge pieces for each pair being geared together as by the use of gear segments 26 (see Fig. 3) to cause them to turn in unison. The hinge pieces 25 on each side of the vertical median line of the grab are secured to each other by spacers 27 (see Figs. 6 and 7), to which they are appropriately secured as by bolts 28.

Referring now to Fig. 1, the hinge pieces afford support for shells 29, to which jaws 30 are attached. In practice each shell is made up of several plates of sheet metal secured together to the hinge piece and to the jaw by a large number of rivets, which, however, have been omitted in the drawings, because, if shown, they would tend to obscure the features which have to do with the present invention.

Referring to Fig. 3, the opening of the grab is accomplished by mechanism, herein including a toggle comprising two links 31, each of which is branched (see Figs. 6 and 7) and presents two arms 32 connected by an integral brace 33. Each arm presents an ear or boss 34 received between two ears or bosses 35 presented by the spacer 27. Hinge pins 36 extending through each set of ears afford pivots about which the links turn relatively to the hinge pieces. Referring again to Fig. 3, the lower ends of the toggle links are interconnected as by segmental gears 37, and they are pivoted as by hinge pins 38 to a lower or bottom head 39. This head constitutes a holding sheave frame on which a holding sheave 40 receives journal support by a pin 41 suitably held in place as by keeper plates 42 received in grooves 43, presented by the pin 41.

A holding rope 44 presents a bight in which the sheave 40 is suspended, and the leads of this rope extend in an upward direction through the upper head 20, which, as best shown in Fig. 2 is provided with two pairs of guide rollers 45 and 46, one pair at right angles to the other (see also Fig. 11) to guide the rope and to prevent it from becoming chafed. The lower part of the holding rope sheave is protected by an appropriate housing or bonnet 47, best shown in Fig. 2, having a circumferential portion 48, which presents a rope guard close to the periphery of the sheave (see Fig. 3), to prevent the rope from becoming disengaged from the groove of the sheave.

Referring now to Fig. 12, movement of one head towards the other when the grab opens is limited by appropriate stops, here in abutments 48' on the lower head, adapted to engage abutments, such as wooden buffer blocks 49, conveniently supported by the upper head, as by providing the latter with chambers 50 in which the blocks are received. These blocks being of somewhat elastic material, cushion the impact. The blocks are held in place by appropriate means, herein screws 51, the removal of which permits the blocks to be renewed when they become worn. Openings 52 above the blocks are provided for use of a suitable tool to drive the blocks out of their chambers.

The closing rope and its sheaves will now be described, reference being had at first to Fig. 11. A closing rope 53 has two leads which extend downwardly through the upper head, and to prevent them from becoming chafed, two pairs of guide rollers 54 and and 55 (see Fig. 2) similar to those provided for the holding rope, are employed. These two leads of the closing rope extend thence over sheaves 56 (Fig. 11) carried by the upper head. Herein these sheaves are mounted to turn on and about the hinge pins 22, as a result of which the opening movement of the hinge pieces on the hinge pins is accompanied by the wrapping of the leads in somewhat longer arcs on the sheaves, as will be evident from a comparison of Figs. 3 and 11. Associated with the sheaves 56 are appropriate rope guards 57 (see Fig. 11), which prevent the rope from becoming disengaged from the grooves of the respective sheaves (see also Fig. 2). These guards are conveniently supported on the yokes 23, as by brackets 58.

Referring again to Fig. 11, the closing rope is appropriately connected to the hinge pieces 25 to cause the latter to be drawn together when the leads are wound in by the overhead drums. To this end, in the present example, a multiple part purchase is employed, and there are other sheaves received in a bight presented by the closing rope. In the following description it will be convenient to refer to the sheaves 56 as the primary sheaves, inasmuch as they are the ones over which the closing rope passes first. The rope passes from these sheaves over other sheaves 59, which it will be convenient to refer to as secondary sheaves. These sheaves are supported by the hinge pieces 25 in a manner best shown in Figs. 6 and 7. Each sheave turns on a pin 60, one end of which is received in a boss 61 presented by the hinge piece 25, and the other end is received in a boss or ear 62, presented by the spacer 27. Herein the pin is secured in the boss 61 by a pin 63. Associated with each of the sheaves 59 is an appropriate rope guard, herein a roller 64 (see Fig. 2) carried by a pair of arms 65, which are freely pendant on and about the pin 60 on which the sheave turns. It follows that the arms and the rollers which they carry tend to hang in a vertical position after the fashion of a pendulum, as the grab opens and closes.

The closing rope, after leaving the sheaves 59, passes over sheaves 66, which may be termed sling sheaves, as they are pivotally mounted on hinge pieces to enable them to be lifted up out of the way when the grab is opened. Referring now to Fig. 8, each of the sling sheaves is mounted to turn on and about a pin 67, suitably secured, as by a keeper 68, to arms 69 of a frame 70 (see Fig. 9), presenting a hub 71 through which a pivot pin 72 extends, the terminal portions of said pin being mounted in plates 73 presented by the shell 29. A housing or bonnet 74 (see the lower part of Fig. 3) disposed about the sheave and supported by the frame 70 protects the sheave and the rope and presents a circumferential rope guard 75 having angular slots 76 (see Figs. 3 and 11) through which the rope emerges as it leaves the groove of the sheave. The angularity of the slots takes care of a certain amount of lateral play of the rope due to the swinging motion of the pivoted sheave-supporting frame.

To keep the sling sheaves elevated when the grab is opened (see Fig. 11) there is provided means connecting each sling sheave frame with the hinge piece on which the other sling sheave frame is supported. To this end, in the present example there is secured to the hub of each sling sheave frame an arm 77 conveniently secured to the hub as by being split to provide a clamping collar 78 having bolts 79 which clamp it about the hub. To the free end of this arm a rope 80 is secured, as by a shackle 81 having a pin 82 adapted to be received in any one of a series of holes 83 (see Fig. 9) in the arm. This provides an adjustment enabling the effective length of the arm to be varied at will. The rope passes over a deflecting sheave 84 and thence crosses over to the other side of the grab where it is secured to the opposite hinge piece as by a cringle 85 (see Fig. 4), pivoted on a stud 86, having a reduced portion 87 which extends through the adjacent side of the hinge piece 25, and is riveted or headed over at 88. A washer 89 at the outer end of the stud and a pin extending through the latter hold the cringle in place on the stud. A turn-buckle 91 (see the central portion of Fig. 3) introduced at a suitable point in the rope, provides an adjustment for the length of the latter. The deflecting sheave 84 (see Fig. 5) is mounted to turn on and about a stud 92 on a supporting bracket 93, which is secured to the adjacent side of the hinge piece 25. This bracket presents a rope guard 94 close to the circumference of the sheave to prevent the rope from coming out of the groove. The deflecting sheave is, of course, placed in a proper position to prevent interference of the rope with other parts of the grab during the opening and closing movements of the latter.

From a comparison of Figs. 2 and 10, it will be observed that the holding rope sheave is disposed crosswise of the grab and that its axis is somewhat inclined with reference to the median line of the grab as viewed from the top. This is to enable the rope leads to be correctly positioned with reference to winding drums (not shown). It should also be observed by reference to Fig. 2 that the primary sheaves 56 are on opposite sides of the holding sheave and are, of course, a considerable distance apart. Likewise the secondary sheaves 59 are similarly situated as, of course, each is in line with its associated primary sheave. The sling sheaves 66, however, are angularly disposed to secure the correct leads from one to the other (see Fig. 10) and to the secondary sheaves (see also Fig. 3).

In the operation of the grab the latter is opened by winding in one end of the holding rope and paying out one end of the closing rope in the proper proportion. The winding in of the holding rope lifts the lower head and the latter as it rises rocks the toggle links from the normal position shown in Fig. 3, thus causing the toggle to straighten toward the position shown in Fig. 12. The outer ends of the toggle links normally push the hinge pieces apart to the position shown in Fig. 11. During this movement, of course, the closing rope is paid out just sufficiently to enable the grab to be opened without undue slack forming in the closing rope. During the opening movement, each hinge piece exerts a pull on the sling-sheave controlling rope of the other hinge piece and thus lifts the corresponding sling-sheave and maintains it in such position that it is properly aligned with the other sheaves and accordingly the rope runs true without danger of chafing. To close the grab, this operation is reversed, the closing rope is wound in. This allows the lower head to descend, while the pull exerted on the bight of the closing rope draws the hinge pieces toward each other with a very powerful action due to the purchase afforded by the several sheaves over which the closing rope passes. This should be evident from an examination of Fig. 11.

Having thus described one embodiment of the invention, but without limiting myself thereto, what I claim and desire by Letters Patent to secure is:

1. In a grab, the combination of a top head, a bottom head, two hinge pins carried by said top head, two pairs of hinge pieces pivoted to said hinge pins, the hinge pieces of each pair being geared together to cause them to turn in unison, a toggle comprising two links pivoted to said hinge pieces, respectively, and to said bottom head, said links being geared together to cause them to turn in unison, a holding rope sheave carried by said bottom head, a holding rope presenting a bight in which said holding rope sheave is hung, abutments presented by said top and bottom heads for engagement with each other when the grab opens, two primary sheaves mounted to turn on and about said hinge pins, respectively, two secondary sheaves carried by said hinge pieces, respectively, two sling sheaves, two sling sheave frames on which said sling sheaves, respectively, are mounted to turn, two sling sheave frame hinge pins on which said frames, respectively, are mounted to turn, a closing rope extending in a downward direction over one primary sheave, thence over the secondary sheave carried by one hinge piece, thence over the sling sheave carried by the other hinge piece, thence over the sling sheave carried by the other hinge piece, thence over the remaining secondary sheave, thence over the remaining primary sheave and finally upwardly, and two ropes, each connecting a hinge piece to the sling sheave frame carried by the other hinge piece to utilize opening movement of the grab to position said frames.

2. In a grab, the combination of upper and lower heads, a holding rope which supports said lower head and is unconnected to said upper head, a pair of hinge pieces pivoted to said upper head to turn about separate axes, a pair of sheaves mounted to turn about the pivotal axes of said hinge pieces, respectively, and a closing rope which extends in a downward direction over said sheaves and is connected to said hinge pieces to draw them together.

3. In a grab, the combination of upper and lower heads, a holding rope which supports said lower head and is unconnected to said upper head, a pair of hinge pieces pivoted to said upper head to turn about separate axes, a pair of sheaves mounted to turn about the pivotal axes of said hinge pieces, respectively, a closing rope which extends in a downward direction over said sheaves and is connected to said hinge pieces to draw them together, and rope guards supported by said upper head between said hinge pieces and associated with said sheaves, respectively, to keep said closing rope in place.

4. In a grab, the combination of upper and lower heads, a holding rope which supports said lower head and is unconnected to said upper head, a pair of hinge pieces pivoted to said upper head to turn about separate axes, a pair of primary sheaves mounted on said upper head to turn about said axes, a pair of secondary sheaves mounted on said hinge pieces, respectively, a closing rope which extends in a downward direction over said primary sheaves and thence over said secondary sheaves, and rope guards associated with said sheaves, respectively, to keep said closing rope in place.

5. In a grab, the combination of upper and lower heads, a holding rope which supports said lower head and is unconnected to said upper head, a pair of hinge pieces pivoted to said upper head to turn about separate axes, a pair of primary sheaves mounted on said upper head to turn about said axes, a pair of secondary sheaves mounted on said hinge pieces, respectively, a pair of tertiary sheaves carried by said hinge pieces, respectively, a closing rope which extends in a downward direction over said primary sheaves, thence over said secondary sheaves and thence over said tertiary sheaves, and rope guards associated with said sheaves, respectively, to keep said closing rope in place.

6. In a grab, the combination of upper and lower heads, a holding rope which supports said lower head and is unconnected to said upper head, a pair of hinge pieces pivoted to said upper head to turn about separate axes, a closing rope, a pair of sheaves over which said closing rope passes, said sheaves being mounted to turn about said axes, and a pair of rope guards associated with said sheaves, respectively, and pivoted to swing about the axes of said sheaves.

7. In a grab, the combination of upper and lower heads, a holding rope which supports said lower head and is unconnected to said upper head, a pair of hinge pieces pivoted to said upper head to turn about separate axes, a closing rope, a pair of sheaves over which said closing rope passes, said sheaves being mounted to turn about said axes, and a pair of rope guards associated with said sheaves, respectively, and mounted on said upper head.

8. In a grab, the combination of top and bottom heads, hinge pieces hingedly connected to said top head, a holding rope connected to said bottom head, a closing rope, closing rope sheaves including two sling sheaves pivotally carried by said hinge-pieces, respectively, and two ropes, each connecting a hinge-piece to the sling sheave carried by the other hinge-piece to utilize opening movement of the grab to lift said sling sheaves.

9. In a grab, the combination of upper and lower heads, a holding rope sheave carried by said lower head, a holding rope unconnected to said upper head and presenting a bight in which said sheave is hung independently of said upper head, a pair of hinge pieces pivoted to said upper head, a toggle comprising two links pivoted to said lower head and pivoted to said hinge pieces, respectively, and a closing rope connected to said hinge pieces to draw them together.

10. In a grab, the combination of upper and lower heads, a holding rope sheave carried by said lower head, a holding rope unconnected to said upper head and presenting a bight in which said sheave is hung independently of said upper head, a pair of hinge pieces pivoted to said upper head, a toggle comprising two links pivoted to said lower head and pivoted to said hinge pieces, respectively, means postively connecting said links to cause them to swing in unison, and a closing rope connected to said hinge pieces to draw them together.

11. In a grab, the combination of upper and lower heads, a holding rope which supports said lower head and is unconnected to said upper head, a pair of hinge pieces pivoted to said upper head, a toggle comprising two links pivoted to said lower head and pivoted to said hinge pieces, respectively, sheaves carried by said upper head and mounted to turn about the axes of said hinge pieces, respectively, and a closing rope extending over said sheaves and connected to said hinge pieces to draw them together.

12. In a grab, the combination of upper and lower heads, a holding rope which supports said lower head and is unconnected to said upper head, a pair of hinge pieces pivoted to said upper head, means operated by said lower head independently of said upper head to move said hinge pieces apart, sheaves pivotally carried by said hinge pieces, respectively, and a closing rope extending over said sheaves to draw said hinge pieces together.

13. In a grab, the combination of a pair of pivotally connected hinge pieces, a holding rope, a closing rope, closing rope sheaves including two sheaves pivotally supported on said hinge pieces, respectively, and means to utilize swinging movement of said hinge pieces relatively to each other to cause swinging movement of said pivotally supported sheaves relatively to the hinge pieces on which they are respectively supported.

14. In a grab, the combination of a pair of pivotally connected hinge pieces, a holding rope, a closing rope, two closing rope sheaves, frames on which said sheaves are mounted, said frames being pivotally carried by said hinge pieces, respectively, and means connecting each hinge piece to the frame carried by the other hinge piece to utilize relative swinging movement of said hinge pieces to cause swinging movement of said frames relatively to said hinge pieces, respectively.

15. In a grab, the combination of an upper head, two hinge pins carried by said head, two pairs of hinge pieces pivoted to said hinge pins, the hinge pieces of each pair being geared together to cause them to turn in unison, lower head, a toggle comprising two links pivoted to said hinge pieces, respectively, and to said bottom head, said links being geared together to cause them to turn in unison, a holding rope which supports said lower head, a pair of sheaves mounted to turn about the axes of said hinge pins, and a closing rope which extends in a downward direction over said sheaves and is connected to said hinge pieces to drawn them together.

16. In a grab, the combination of an upper head, two hinge pins carried by said head, two pairs of hinge pieces pivoted to said hinge pins, the hinge pieces of each pair being geared together to cause them to turn in unison, a lower head, a toggle comprising two links pivoted to said hinge pieces, respectively, and to said bottom head, said links being geared together to cause them to turn in unison, holding rope sheaves carried by said lower head, a holding rope presenting a bight in which said holding rope sheave is hung, a pair of sheaves mounted to turn about the axes of said hinge pins, and a closing rope which extends in a downward direction over said sheaves and is connected to said hinge pieces to draw them together.

17. In a grab, the combination of an upper head, two pairs of hinge pieces pivoted to said head, a lower head, a toggle comprising two links pivoted to said hinge pieces, respectively, and to said bottom head, said links being geared together to cause them to turn in unison, a holding rope which supports said lower head, a pair of sheaves adjacent the pivots of said hinge pieces, and a closing rope which extends in a downward direction over said sheaves and is connected to said hinge pieces to draw them together.

In testimony whereof, I have signed my name to this specification.

ALMON E. NORRIS.

CERTIFICATE OF CORRECTION.

Patent No. 1,671,444.             Granted May 29, 1928, to

ALMON E. NORRIS.

It is hereby certified that error appears in the printed specification of the above numbered patent requiring correction as follows: Page 1, line 44, for the numeral "2" read "21"; page 5, line 1, before the word "lower" insert the article "a"; and that the said Letters Patent should be read with these corrections therein that the same may conform to the record of the case in the Patent Office.

Signed and sealed this 10th day of July, A. D. 1928.

(Seal)

M. J. Moore,
Acting Commissioner of Patents.